US005998787A

United States Patent [19]

Hager

[11] Patent Number: 5,998,787

[45] Date of Patent: Dec. 7, 1999

[54] METHOD OF OPERATING A MASS SPECTROMETER INCLUDING A LOW LEVEL RESOLVING DC INPUT TO IMPROVE SIGNAL TO NOISE RATIO

[75] Inventor: James W. Hager, Mississauga, Canada

[73] Assignee: MDS Inc., Etobicoke, Canada

[21] Appl. No.: 08/961,771

[22] Filed: Oct. 31, 1997

[51] Int. Cl.$^6$ .............................. B01D 59/44; H01J 49/00

[52] U.S. Cl. ........................... 250/282; 250/288; 250/292

[58] Field of Search ..................................... 250/281, 292, 250/282, 288

[56] References Cited

U.S. PATENT DOCUMENTS

| | | | |
|---|---|---|---|
| 4,090,075 | 5/1978 | Brinkmann | 250/282 |
| 4,189,640 | 2/1980 | Dawson | 250/290 |
| 4,328,420 | 5/1982 | French | 250/292 |
| 4,329,582 | 5/1982 | French et al. | 250/292 |
| 4,535,235 | 8/1985 | Mciver | 250/291 |
| 4,963,736 | 10/1990 | Douglas et al. | 250/292 |
| 5,179,278 | 1/1993 | Douglas | 250/290 |
| 5,739,530 | 4/1998 | Franzen et al. | 250/292 |

*Primary Examiner*—Bruce C. Anderson
*Attorney, Agent, or Firm*—Bereskin & Parr

[57] ABSTRACT

A method is provided of operating a mass spectrometer having first and second rod sets, which can be a focusing set of rods and an analysis rod set, the second rod set being downstream from the first rod set at an outlet of a spectrometer. Ions are directed into the first rod set and an RF voltage applied to the two rod sets, the RF voltage can be the same or different for the two rod sets. A low level DC voltage is applied to the first rod set sufficient to reduce a continuum background ion signal, thereby to increase the signal-to-noise ratio of the spectrometer.

10 Claims, 6 Drawing Sheets

RF-ONLY ION ENERGY DISTRIBUTIONS quats 30-600 0 V DC et al.: 0.5 μM quats, 0 V DC
Spectrum from 0.62 min (27 scans) from quats 30-600, 0 V DC 1.26e5 cps Spectrum from 0.53 min (23 scans) from quats 30-600, -1.0 DAC DC 1.34e5 cps Spectrum from 0.86 min (37 scans) from quats 30-600, -2.0 DAC DC 1.45e5 cps

METHOD OF OPERATING A MASS SPECTROMETER INCLUDING A LOW LEVEL RESOLVING DC INPUT TO IMPROVE SIGNAL TO NOISE RATIO

FIELD OF THE INVENTION

This invention relates to a mass analyzer. More particularly, it relates to a rod type mass analyzer or spectrometer, which is simple and inexpensive, and which includes both applied RF and DC voltages.

BACKGROUND OF THE INVENTION

Quadrupole mass spectrometers have proven to be general purpose mass analyzers. These devices are four rod structures and, when operated in a resolving mode, the rods are usually about 20 cm in length and require extreme mechanical precision in terms of fabrication and alignment. When operated in resolving mode quadrupole mass spectrometers have both RF and DC voltages applied to them, and are pumped to a relatively high vacuum (e.g. $10^{-5}$ Torr). Values of these voltages vary with the frequency and mass range of operation, but can be on the order of 1600 volts (peak-to-peak) RF for operation at 1 MHz and ±272 volts DC for a rod array inscribed radius $r_0$ of 0.415 cm and a mass range of 600 Daltons. The high degrees of mechanical and electrical sophistication required means that the costs of these mass spectrometers are high.

There has accordingly been a long standing need for a simpler, less expensive mass spectrometer. While costs have been reduced, quadrupole and other rod mass spectrometers (e.g. octopoles and hexapoles) have continued to remain extremely expensive and to require very close tolerances and high vacuum pumping equipment, as well as costly power supplies.

Attempts have been made to simplify the design and operation of quadrupole mass spectrometers, and one proposal is found in U.S. Pat. No. 4,090,075. This patent teaches that a quadrupole mass spectrometer can provide mass resolution in the absence of applied resolving DC voltages. This so called RF-only mode of operation has several advantages over conventional RF/DC operational modes. Conventional RF/DC quadrupole rod mass spectrometers supply mass resolution based on the intrinsic stability or instability of given ions within the rod structure in the combination of the time varying RF and the time independent DC fields. In contrast to the more common RF/DC quadrupole mass analyzers, mass resolution for an RF-only instrument is thought to occur when ions that are only marginally stable with a particular applied RF voltage gain excess axial kinetic energy in the exit fringing field of the rod structure. A large part of the phenomena leading to mass resolution of an RF-only mass analyzer occurs at the exit of the rod array, so the length limitations characteristic of RF/DC resolving quadrupoles no longer apply and mechanical tolerances for rod roundness and straightness are considerably relaxed. Finally, there is no need for a high precision high voltage DC power supply in the RF-only mode of operation. Taken together the inherent advantages of RF-only operation suggest the opportunity for a much smaller and less costly mass analyzer than conventional RF/DC quadrupoles. Although the potential of such a device is significant, problems arise, such as sample dependent background from high velocity ions and clusters. The current invention describes a method for elimination of these background species.

Another proposal is found in U.S. Pat. No. 4,189,640, which describes a method for background reduction for RF-only quadrupole mass analyzers. This invention teaches that a centrally located attractively biased disk of the appropriate size located after the analyzing quadrupole reduces high velocity and higher mass species. However, in practice this also reduces analyte ion intensity offsetting much of the expected gains in the signal-to-noise ratio.

SUMMARY OF THE INVENTION

In accordance with the present invention, there is provided a method of operating a mass spectrometer having first and second rod sets, the second rod set being downstream from the first rod set and at an outlet of the spectrometer, the method comprising: directing ions into the first rod set; applying an RF voltage to the first rod set and an RF voltage to the second rod set; and applying a low level resolving DC voltage to the second rod set sufficient to reduce a continuum background ion signal, thereby to increase the signal-to-noise ratio of the spectrometer.

The method includes the step of detecting, for analysis, ions leaving the second rod set, and optionally the step of energy filtering the ions leaving the analysis rod set, before detecting said ions for analysis. As noted above, the method is based on the so-called RF-only mode of operation, and the RF voltage applied to the second rod set can be scanned, thereby to obtain an m/z spectrum.

In one mode of operation, the DC voltage is maintained at a constant ratio with respect to the RF voltage, so as to scan the DC voltage with the mass of ions detected. Alternatively, a constant DC voltage is applied, and the DC and RF voltages are then selected so as to permit a desired analyte ion to pass through the spectrometer for detection, but such as to cause heavier, background ions to be substantially rejected, whereby the background ions are substantially not detected.

In conventional spectrometer operation at the tip of the a–q diagram, it is necessary to control the RF and DC levels accurately. In contrast, with the present invention, as the DC level is used for entirely different purposes, the tolerance on the DC to RF ratio can be in a much larger band and preferably is kept within a range of plus or minus 15%.

Where a fixed DC level is used, the DC voltage is preferably in the range 0–15.5 volts. It may alternatively lie between 0 volts DC and 40% of the DC normally required for the rod set to operate at the tip of the a–q stability diagram for the rod set.

Advantageously, the method is carried out with a mass spectrometer including at least one additional, upstream rod set, wherein the method comprises applying an RF voltage to the upstream rod set and a DC offset voltage to all the rods of the upstream rod set. The second rod set can comprise an analysis rod set comprising a quadrupole rod set, wherein the DC voltage is applied between opposite pairs of rods, whereby one opposite pair of rods is at one potential and the other opposite pair of rods is at another potential.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF THE PREFERRED EMBODIMENT

Figure 1:
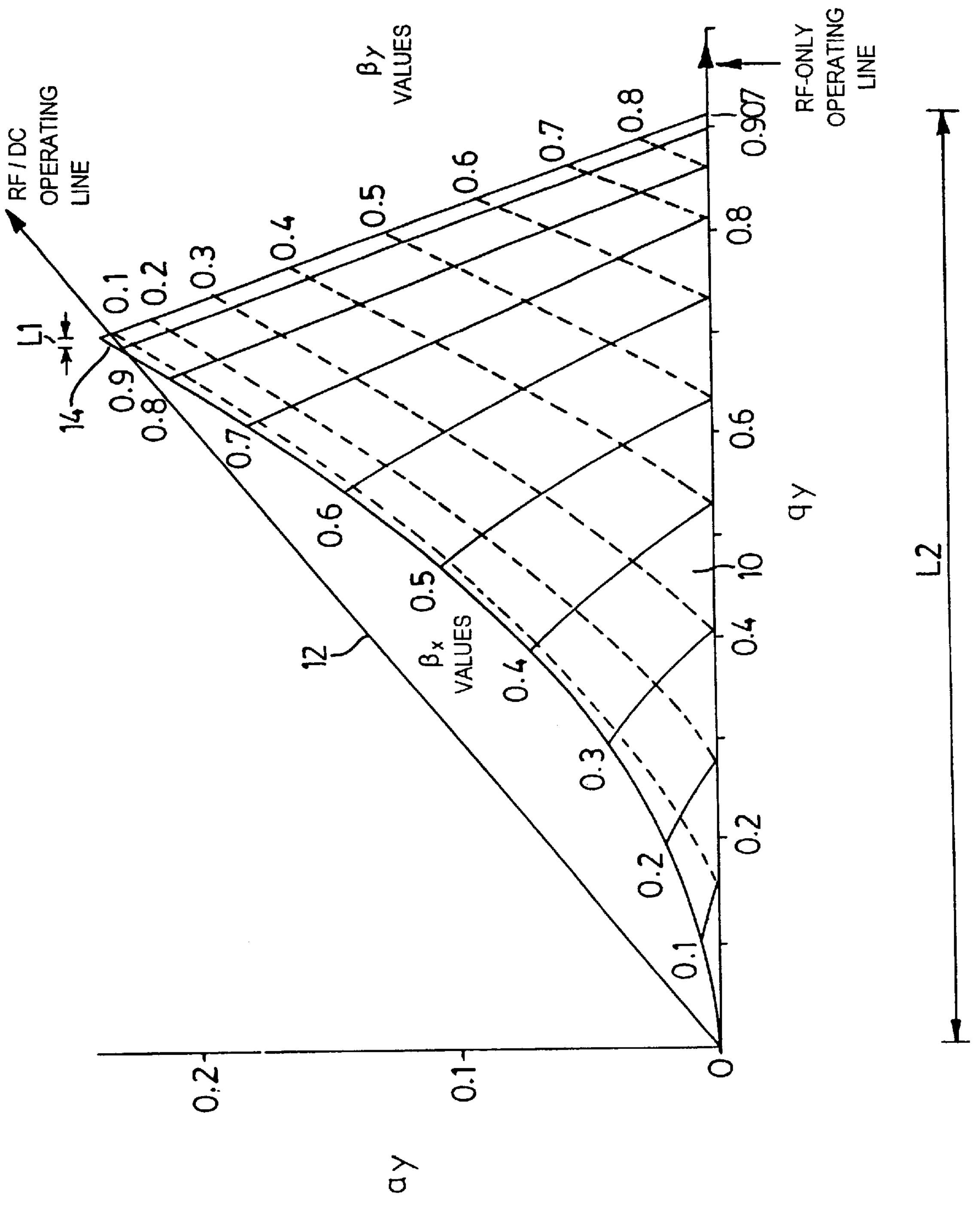
FIG. 1 is a plot of the well-known a–q operating diagram for quadrupole mass spectrometer.

Referring to FIG. 1 which shows the well known operating diagram for a quadrupole mass spectrometer, the a parameter is plotted on the vertical axis and the q parameter on the horizontal axis. Here, as is well known:

$a=8eU/(m\omega^2 r_0^2)$ $q=4eV/(m\omega^2 r_0^2)$ where U is the amplitude of the DC voltage applied to the rods, V is the RF voltage applied to the rods, e is the charge on the ion, m is its mass, ω is the RF frequency, and $r_0$ is the inscribed radius of the rod set.

In the FIG. 1 operating diagram ions within the shaded area are stable provided they are above the operating line. In conventional RF/DC operation the operating line is made to lie near the tip or apex 14 of the operating diagram. The operating line is indicated at 12 and shows operation at a constant DC/RF ratio. The theoretical resolution of such a device is given by the width L1 of the peak above the operating line divided by the width L2 of the base of the operating diagram. This requires, as mentioned, substantial RF and DC voltages be applied to the rods. In theory very high mass resolution is possible with RF/DC quadrupoles operating near the tip of the stability diagram, but this requires extremely high mechanical precision of the dimensions of the rod structure and high precision control of the RF voltage, the DC voltage, and the RF/DC ratio. Degradation of any of these high tolerances directly affects the mass resolving capabilities of the device and can lead to poor analytical performance.

Operation of a quadrupole in RF-only mode (that is without DC) is known and effectively results in the operating line in FIG. 1 being along the horizontal axis. Thus, the device acts essentially as an ion pipe and transmits ions with a very wide range of mass to charge ratio (m/z). Ions with q<~0.907 are stable. Ions with a q value above ~0.907 become radially unstable, hit the rods, and are not transmitted.

Mass resolution of an RF-only quadrupole mass spectrometer is thought to occur when ions with q of ~0.907 gain significant radial amplitude. In the exit fringing field of the device these ions, with large radial trajectories, are subjected to intense axial fields, and thus, these ions emerge with large exit axial kinetic energies. The fact that the phenomenon responsible for mass resolution of an RF-only quadrupole occurs at the exit of the device rather than throughout the length of the rod structure means that mechanical tolerances are significantly relaxed with respect to those of a conventional RF/DC quadrupole mass spectrometer.

The ions near q~0.907 that have higher exit axial kinetic energies than the lower q ions can be detected preferentially by virtue of this excess axial kinetic energy. In practice energy filtering is accomplished by the placement of a retarding grid either at the exit of the quadrupole or further downstream. Particles are detected when $(mv_n^2)/2>eV_r$ where m is the mass of the ion, e is the charge on the ion, $v_n$ is the ion velocity normal to the grid plane, and $V_r$ is the retarding potential applied to the grid. Ion optic elements other than a planar grid can also be employed with varying efficiencies.

Figure 2B:
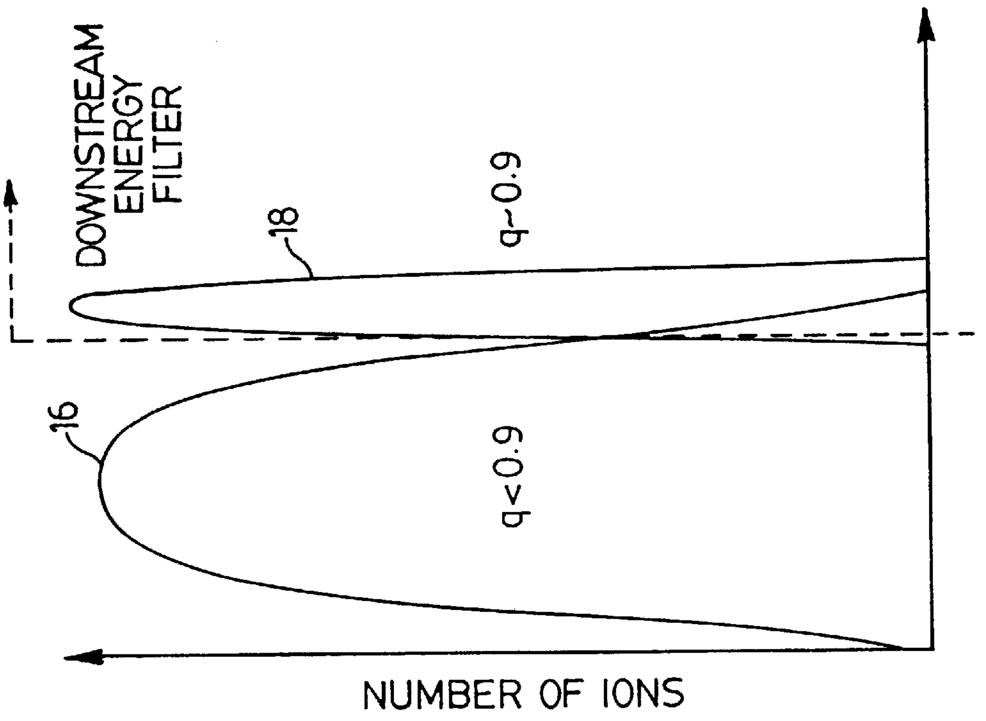
FIG. 2*b* is a plot similar to FIG. 2*a*, but showing the ion energy distribution after the ions have passed through the fringing fields of the exit end of the RF-only quadrupole rods.
Figure 2A:
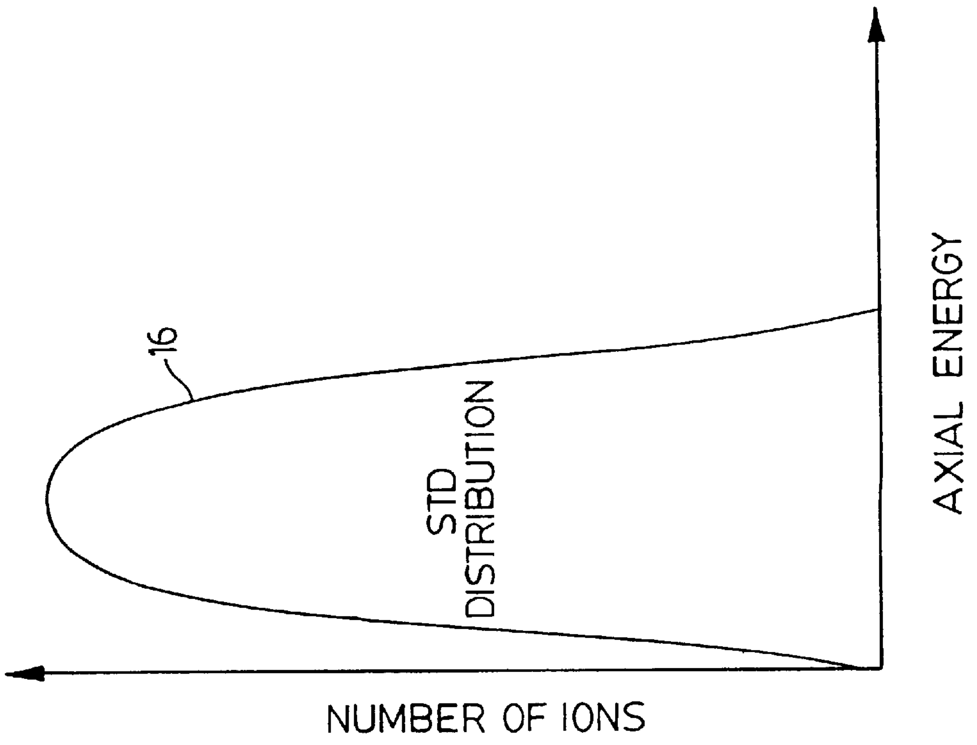
FIG. 2*a* is a plot showing the distribution of an ion axially energies produced by a typical RF-only quadrupole set of rods.

The energy considerations are illustrated in FIGS. 2A and 2B. FIG. 2A shows the standard axial energy distribution 16 of ions introduced into an RF-only quadrupole rod set, plotted against the number of ions. The width of the energy distribution curve 16 will depend on the a number of factors such as the nature of the ion source and the ion optics in front of the quadrupole rods.

FIG. 2B shows the curve 16 from FIG. 2A and also the curve representing the distribution of axial energies 18 of ions whose q is about 0.9 and which therefore have received additional axial energy in the exit fringing field at the end of the RF-only quadrupole rods. If there is sufficient separation between the two curves energy filtering using a grid can be made very efficient, and only the ions that have gained axial kinetic energy in the exit fringing field are detected. A mass spectrum can be obtained in this way, by scanning the RF voltage applied to the quadrupole rods to bring the q of ions of various masses to near 0.907, at which time the large radial energies which they acquire yield increase axial energies, so these ions can be separated.

A drawback associated with this energy filtering technique is that there can be a significant high energy tail in the energy distribution 16 of ions entering the quadrupole rods. These high energy ions can originate in the ion source itself, the ion optics used to transport the ions from the source to the quadrupole rods, or from physical and chemical changes (such as metastable decomposition or collision-induced fragmentation) of the ion from the ion source to the quadrupole rods. This results in significant overlap of the curves 16 and 18 represented in FIG. 2B and thus the appearance of a continuum background signal upon which rides the resolved peaks from the ions with a q near 0.907. Higher mass ions with q<0.9 but with some radial excitation can also contribute to background ion current. The combination of these effects can lead to poor signal-to-noise and reduced analytical performance.

The problem of an underlying continuum background can be significant and performance limiting for the case of ions introduced from atmosphere using electrospray or atmospheric chemical ionization. These devices can produce ions and ionic clusters of widely varying sizes and energies. Optimum performance characteristics, as defined by the highest signal-to-noise ratio after mass analysis, is obtained by declustering the larger species through a combination of countercurrent gasses, heating, and collision-induced dissociation prior to the quadrupole rods. In the case of the current instrument a countercurrent gas flow and collision-induced cluster dissociation is employed in a differentially pumped region to maximize the intensity of the ion of interest. These conditions, which are typical of instruments of this type, can result in a very broad background ion signal when operating the quadrupole in RF-only mode. Furthermore this broad background has been found to be sample and solvent dependent and can severely reduce the RF-only signal-to-noise ratio.

In accordance with the present invention, it has been found that the application of a low level of resolving DC applied to a nominally RF-only rod set can significantly reduce this performance limiting background by allowing the quadrupole to act as a variable low pass filter while still maintaining the advantages of RF-only operation.

It is known, as a theoretical point, that a quadrupole with low level resolving DC applied to the rods acts as a low pass filter. With reference to the operating diagram in FIG. 1 this simply means that the a value is non-zero and the width of L1 is similar to, but smaller, than the width of L2. The effect is to provide additional discrimination against high mass ions. However, conventional teaching is that one operates in one of two modes, namely with significant DC at the tip 14 or apex as in FIG. 1, or in a pure RF-only mode as detailed above.

Figure 3:
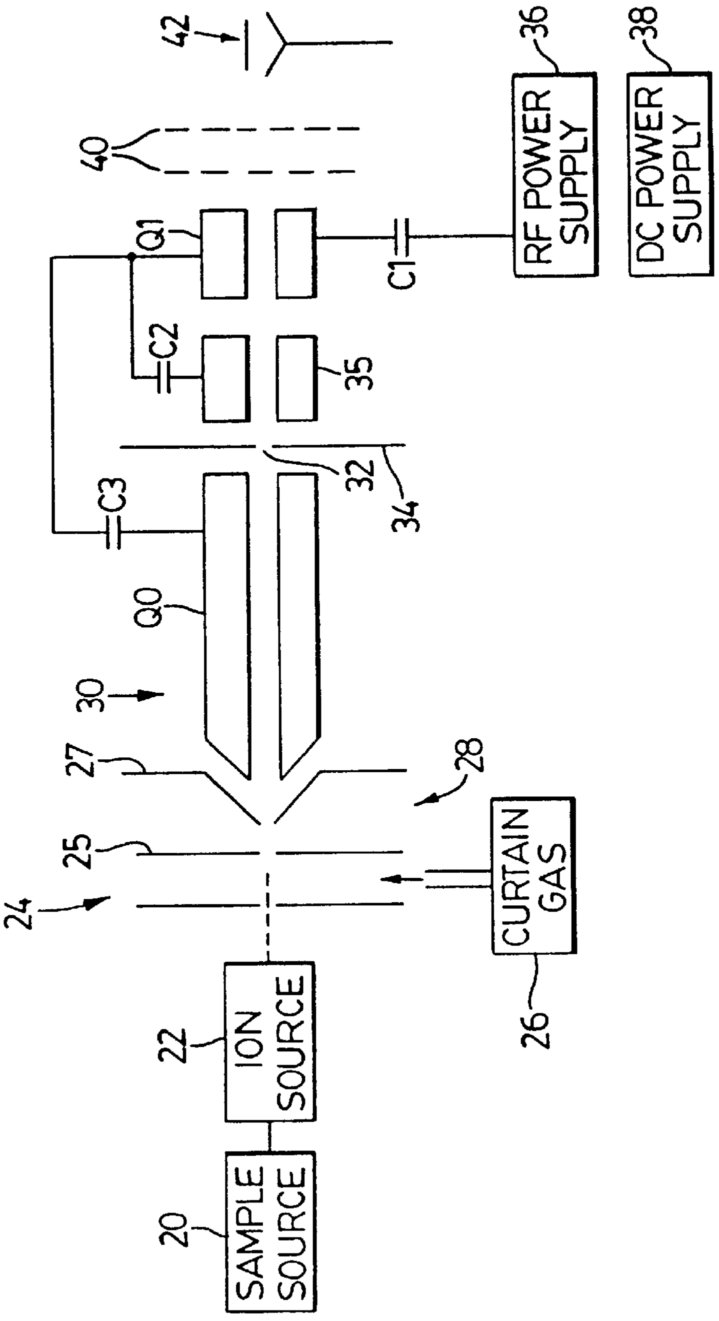
FIG. 3 is a diagrammatic view showing an RF-only mass spectrometer configuration.
Figure 3A:
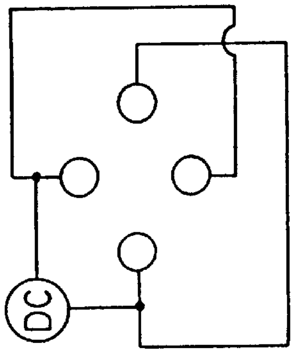

FIG. 3 illustrates an apparatus in accordance with the present invention, which may be employed to obtain a mass spectrum. A sample source 20 (which may be a liquid or gaseous source) supplies sample to an ion source 22 which acts as a generation means and produces ions therefrom and directs them into an interface 24 region which may be supplied with inert curtain gas 26 as shown in U.S. Pat. No. 4,137,750. Ions passing through the gas curtain travel through an orifice in plate 25 to a differentially pumped region 28, at a pressure of about 2 Torr. The ions then pass through an orifice in a further plate 27. The interface region 24 and the differentially pumped region serve as direction means directing the ions into a quadrupole RF-only rod set Q0 in chamber 30, which is pumped to a pressure of about 8 milli-Torr. Rod set Q0 serves to transmit the ions onward with the removal of some gas. In addition, Q0, because of the relatively high pressure therein also serves to collisionally damp and cool the ions to reduce their energy spread, as described in U.S. Pat. No. 4,963,736.

From chamber 30, the ions travel through an orifice 32 in an interface plate 34 and through a short set of RF-only rods 35 into a set of analyzing rods Q1. The short RF-only rods 35 serve to collimate the ions travelling into the analyzing quadrupole Q1. A conventional energy filter 40, consisting of a pair of grids, is located downstream of the analyzing rods Q1, in the ion path, followed by a conventional detector 42.

The rods of Q0 may typically be about 20 cm long, the rods 35 may be typically 24 mm long, and the Q1 rods may typically be 48 mm in length. Analyzing rods Q1 are supplied with RF through capacitor C1 from power supply 36. The same RF is supplied through capacitors C2, C3 to rods Q0 and rods 35. Conventional DC offsets are also applied to the various rods and to the interface plates from a DC power supply 38.

The apparatus described above is otherwise relatively conventional, and can produce a mass spectrum as the RF on the analyzing rods is scanned.

As mentioned, ions approaching a q of 0.907 receive additional axial kinetic energy coupled from their radial energy in the exit fringing field at the exit of the analyzing rods Q1 and are able to surmount the potential barrier created by the energy filter and can reach the detector. Ions with $q<0.907$ can also pass through the energy filter if their kinetic energy is sufficient. These ions do not gain significant energy in the exit fringing field and will be observed as a rather featureless background contribution to the mass spectrum.

In accordance with the present invention, it has now been realized that a low level DC resolving signal applied to the rod set Q1 has numerous advantages and applied in an appropriate manner serves to significantly eliminate unwanted background ions.

Unlike the DC signal applied to the other rod sets Q0, 35, where all the rods of each set are at the same potential, the resolving DC signal applies the DC potential between two pairs of rods in the rod set Q1, so that one opposite pair of rods is at one potential and the other pair of rods is at another potential, the difference being the resolving DC potential. Also, as detailed below, the potential is preferably scanned with mass. Additionally, for a particular analyte, the DC potential can be selected, so as, to substantially eliminate unwanted background ions.

Figure 4A:
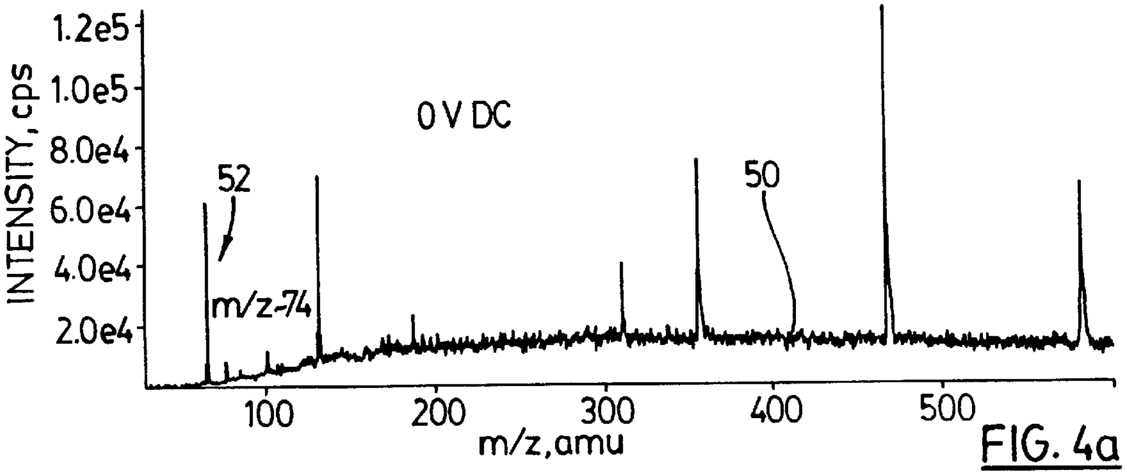
FIGS. 4*a*, 4*b* and 4*c* are graphs of intensity against amu, showing the effect of increasing the DC voltage applied to the rods.
Figure 4B:
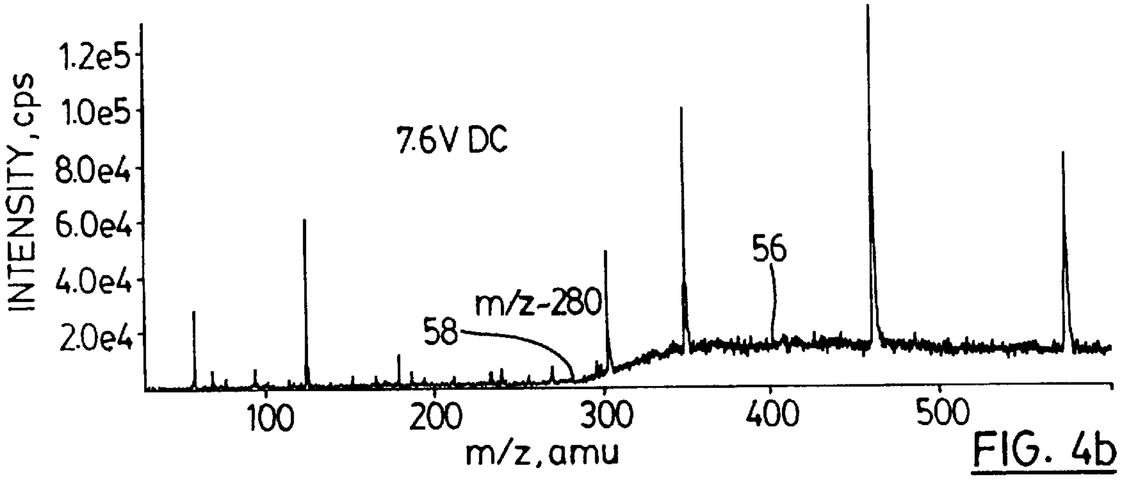
Figure 4C:
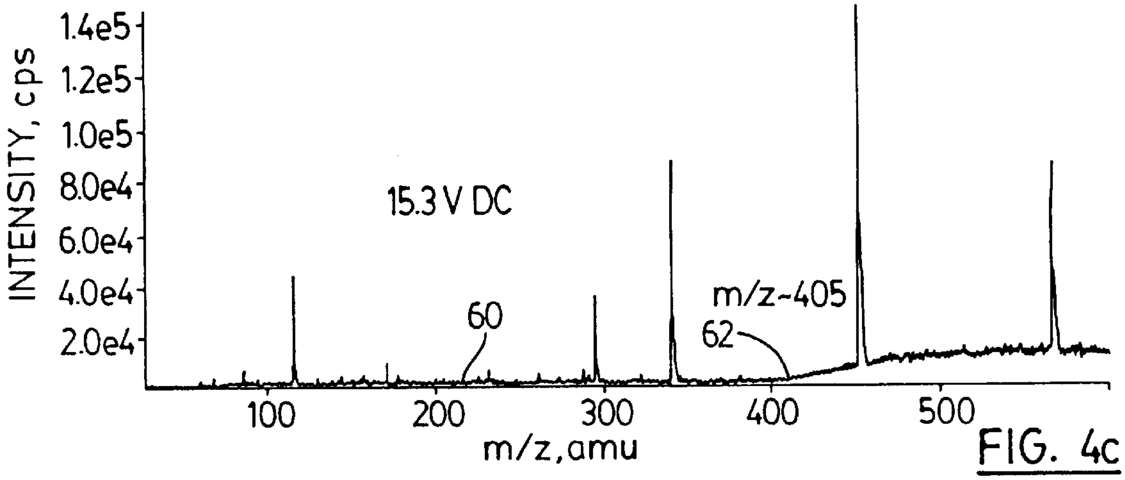

Referring to FIG. 4, this provides an illustration of the effect of gradually increasing DC voltages on a nominally RF-only mass spectrum. The top trace 50, FIG. 4*a*, is the mass spectrum of a mixture of quaternary ammonium salts (0.5 picomoles/microliter each of tetramethyl ammonium hydroxide, tetraethyl ammonium hydroxide, tetrahexyl ammonium hydroxide, tetraoctyl ammonium bromide, and tertadecyl ammonium bromide in 50:50 methanol water) with 0 V DC applied to the rods Q1. This shows a broad continuum background ion signal with an onset 52 at about m/z 74. FIG. 4*b* shows a spectrum 56 in which 7.6 V of DC has been applied, and the onset 58 has moved to approximately m/z 280. Referring to FIG. 4*c*, the lowest spectrum 60, with 15.3 V of DC shows further movement of the onset 62 of the background to about m/z 405. Note that there is a shift in the peak position due to the presence of the different levels of DC. This is expected from the stability diagram. The effect can be eliminated simply by recalibrating the mass axis of the instrument.

The data in FIG. 4 clearly demonstrates the advantages of low levels of DC on the continuum background intensity. The DC levels employed here are much lower than those normally used in conventional RF/DC quadrupole mass spectrometry. For the RF voltage employed here, one would normally need approximately 160 V DC at m/z 350. The data in FIG. 3 was obtained with less than 10% of the normal value.

Figure 5:
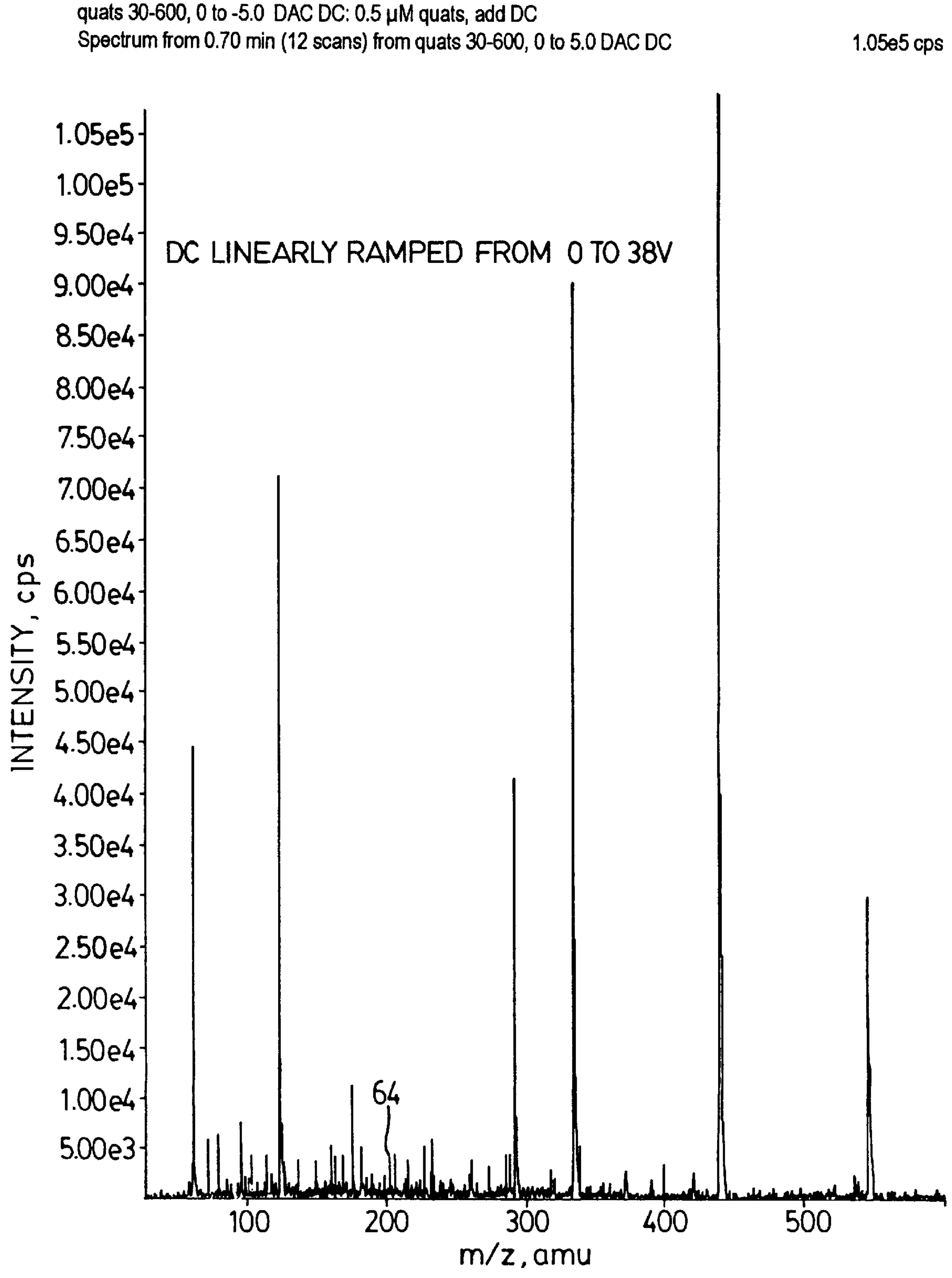
FIG. 5 is a graph of intensity against amu, showing the effect of progressively increasing the DC voltage.

The spectra in FIG. 4 were obtained with a fixed DC voltage and therefore a varying RF/DC ratio across the spectra. In FIG. 1, this fixed DC voltage could be represented as a horizontal line spaced above the horizontal axis, but well below the tip or apex 14. Comparison of the low mass peak intensities among the three spectra in FIG. 4 shows that the result is a loss of some low mass analyte intensity as the DC voltage is increase. However the DC voltage can be readily scanned with mass over the desired range to preserve the low mass peak intensities. An example of this mode of operation is displayed in FIG. 5 in which the DC was scanned linearly with mass from a value of 0 V at m/z 30 to 38 V at m/z 600, so the RF/DC ratio is maintained constant throughout the scan. In FIG. 5, the spectrum is indicated at 64. This mode could be represented by a line similar to line 12 in FIG. 2, but inclined at a much smaller angle, i.e. with a relatively large value of L1. FIG. 5 shows that this scanning mode eliminates the problem of low mass intensity losses and produces a mass spectrum with an excellent signal-to-noise ratio.

Although the RF/DC ratio is maintained approximately constant in FIG. 5, precise control of the ratio is not required; in contrast the conventional RF/DC quadrupole rod operation requires operation near the apex of the stability boundary, and this in turn requires accurate control on the RF/DC ratio to give the desired value of L1. Here, the DC is used only to allow the quadrupole rods to remove high mass background contaminating species more efficiently, prior to detection, rather than to provide the means for mass spectral resolution. Thus, the value of L1 is large and small variations in the RF/DC ratio will not significantly affect the value of L1. It has been found experimentally that the RF/DC ratio in the present invention can vary by more than 15% and still provide excellent background reduction. In contrast the RF/DC ratio must be typically maintained to better than 1% in conventional RF/DC quadrupole mass spectrometers. Although a small amount of DC is employed in the present invention, this does not affect filtering, and the quadrupole rods operate in nominally RF-only mode and still require a downstream energy filter. The amount of DC present does not filter by giving a small L1/L2 ratio in FIG. 1.

The fact that low level resolving DC reduces the RF-only background appears to identify the source of the background as high mass species with sufficient kinetic energy to surmount the repulsive barrier at the exit of the quadrupole rods. These are probably ions and ionic clusters that have been accelerated to high kinetic energies in the atmospheric pressure-to-vacuum interface region by the declustering voltages. Further evidence comes from the fact that addition of modifiers to the solvent such as acids and buffers cause this background to increase. These solvent modifiers are known to increase the production of gas phase clusters in electrospray ionization techniques. High declustering voltages between orifices 25 and 27 also increase the contribution of the broad continuum ion signal since, in this region, multiply charged ions and ionic clusters are accelerated to proportionally higher kinetic energies than singly charged species. It has now been found that the addition of small amounts of DC is sufficient to render these higher mass species unstable in the quadrupole rods, so that they fail to pass through the whole rod assembly and hence are not detected.

Figure 6:
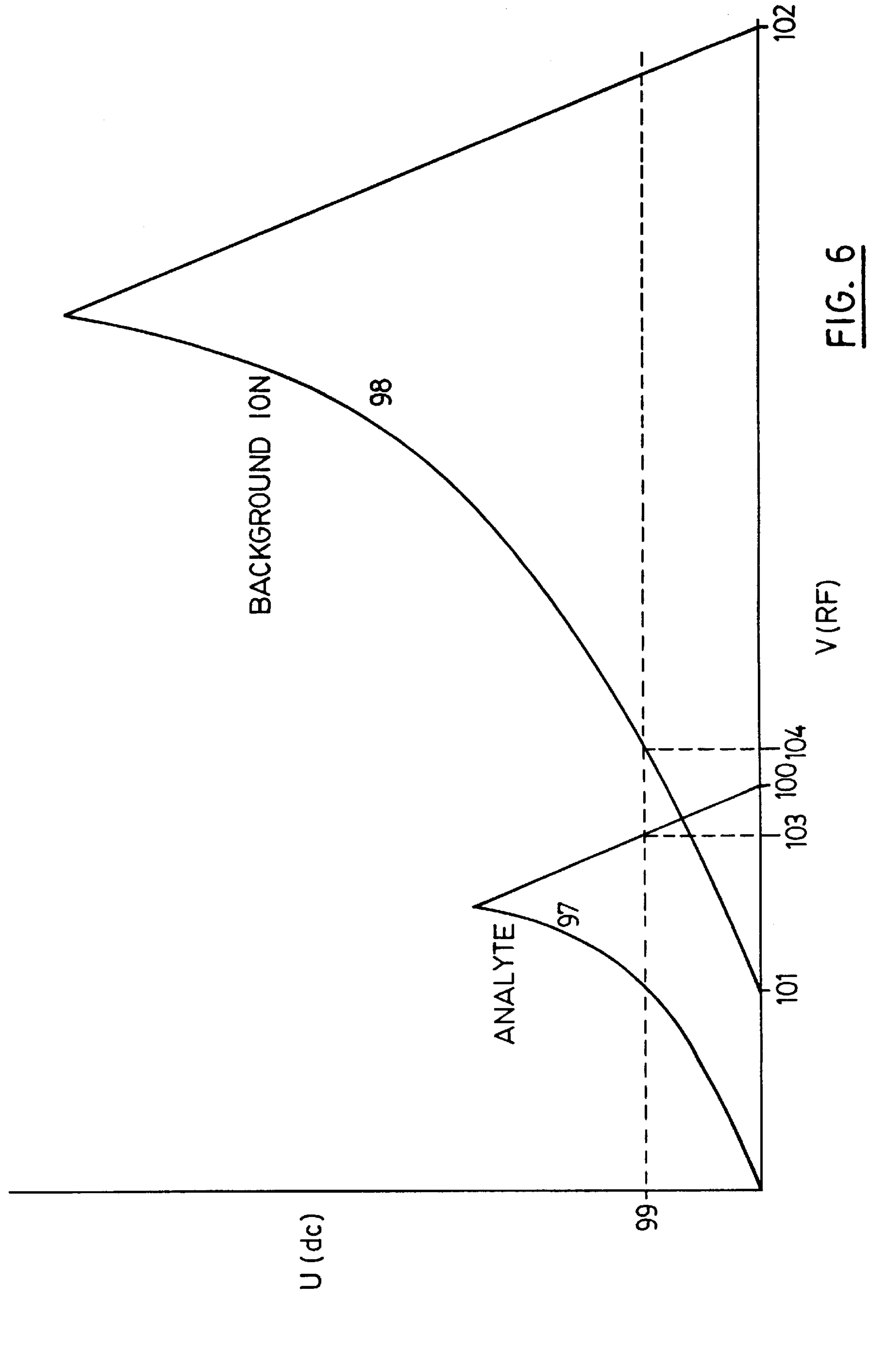
FIG. 6 is a graph of DC voltage against RF voltage, showing characteristics of an analyte and a background ion.

The mechanism of background reduction can be further understood with reference to FIG. 6. Here the operating diagrams of an exemplary analyte ion 97 and an exemplary background ion 98 are displayed in term of V (RF voltage) and U (DC voltage) rather than q and a parameters. Thus, areas under the curves 97, 98 are areas where the respective ions would be stable and would pass through the spectrometer for detection. If it is assumed that the higher mass species is the source of the continuum background ion signal as is currently believed, then operation of the RF-only quadrupole analyzer along the DC=0 axis will result in an analyte peak at an RF voltage corresponding to point 100 and a background signal with an onset at an RF voltage corresponding to point 101 and extending to RF voltage 102. Addition of a small constant DC voltage 99 will shift the analyte peak position to that corresponding to point 103 and the onset of the broad background to point 104. Optimization of the DC voltage can provide complete separation between the RF voltage at which the analyte peak appears and the RF voltage at which the continuum background commences, so as to enhance signal-to-noise and thus to improve analyte detectability.

It has been found that use of this technique significantly enhances the signal-to-noise ratio of a nominally RF-only quadrupole mass analyzer by reducing background contributions from high velocity, high mass species that are often present.

I claim:

1. A method of operating a mass spectrometer having first and second rod sets, the second rod set being downstream from the first rod set and at an outlet of the spectrometer, the method comprising: directing ions into the first rod set; applying an RF voltage to the first rod set and an RF voltage to the second rod set; and applying a low level resolving DC voltage to the second rod set sufficient to reduce a continuum background ion signal, thereby to increase the signal-to-noise ratio of the spectrometer; energy filtering the ions leaving the analysis rod set, before detecting said ions for analysis, whereby ions with an m/z of substantially 0.907 gain sufficient energy to pass through the energy filtering for detection; detecting, for analysis, ions leaving the second rod set.

2. A method as claimed in claim 1, wherein the DC voltage is maintained at a constant ratio with respect to the RF voltage, so as to scan the DC voltage with the mass of ions detected.

3. A method as claimed in claim 2, wherein the tolerance on the DC to RF ratio is kept within a range of plus or minus 15%.

4. A method as claimed in claim 1, wherein a constant DC voltage is applied, and wherein the DC and RF voltages are selected so as to permit a desired analyte ion to pass through the spectrometer for detection, but which cause heavier, background ions to be substantially rejected, whereby the background ions are substantially not detected.

5. A method as claimed in claim 4, wherein the DC voltage is in the range 0–15.5 volts.

6. A method as claimed in claim 4, wherein the DC voltage lies between 0 volts DC and 40% of the DC normally required for the rod set to operate at the tip of the a–q stability diagram for the rod set.

7. A method as claimed in claim 6, wherein the mass spectrometer includes at least one additional, upstream rod set, wherein the method comprises applying an RF voltage to the upstream rod set and a DC offset voltage to all the rods of the upstream rod set.

8. A method as claimed in claim 7, wherein the second rod set comprises an analysis rod set comprising a quadrupole rod set, wherein the DC voltage is applied between opposite pairs of rods, whereby one opposite pair of rods is at one potential and the other opposite pair of rods is at another potential.

9. A method as claimed in claim 4, wherein the tolerance on the DC to RF ratio is kept within a range of plus or minus 15%.

10. A method as claimed in any one of the preceding claims, which includes scanning the RF voltage applied to the second rod set, thereby to obtain an m/z spectrum.

* * * * *